United States Patent [19]

Kamiya et al.

[11] Patent Number: 5,331,504
[45] Date of Patent: Jul. 19, 1994

[54] FILM CAPACITOR AND METHOD FOR MANUFACTURING THE SAME

[75] Inventors: Michiharu Kamiya; Hisaaki Tachihara, both of Matsue; Shuji Otani, Shimane; Kenji Yamada, Matsue; Minoru Kikuchi, Matsue; Kazuo Iwaoka, Matsue; Kenji Kuwata, Matsue, all of Japan

[73] Assignee: Matsushita Electric Industrial Co., Ltd., Osaka, Japan

[21] Appl. No.: 997,476

[22] Filed: Dec. 28, 1992

[30] Foreign Application Priority Data

Dec. 27, 1991 [JP] Japan ................. 3-346015
Dec. 27, 1991 [JP] Japan ................. 3-346017

[51] Int. Cl.$^5$ ............... H01G 4/00; H01G 4/06
[52] U.S. Cl. ............... 361/301.1; 361/301.3; 361/313
[58] Field of Search .......... 361/301.1, 301.3, 313, 361/310; 174/52.2, 52.3; 427/524

[56] References Cited

U.S. PATENT DOCUMENTS 3,649,892  3/1972  Booe ................. 361/313
3,851,363  12/1974 Booe ................. 361/310 X
4,507,331  3/1985  Hiraoka ............. 427/524

FOREIGN PATENT DOCUMENTS 64-77911  3/1989  Japan .
64-77913  3/1989  Japan .
64-77920  3/1989  Japan .
243718    2/1990  Japan .

Primary Examiner—Marvin M. Lateef
Attorney, Agent, or Firm—Renner, Otto, Boisselle & Sklar

[57] ABSTRACT

A film capacitor having moisture resistance includes a capacitor element having (a) a multilayer structure made of stacked dielectric films or a wound dielectric film, each dielectric film having a metallic layer formed on its surface, and (b) a pair of outer electrodes electrically connected to the metallic layer, and a coating layer covering the capacitor element. The coating layer is made from at least one polysiloxane, at least one organometallic compound or a combination of the polysiloxane and the organometallic compound, wherein the organometallic compound is selected from the group consisting of organoaluminum compounds, organosilicon,compounds, organotin compounds and organotitanium compounds. The organometallic compound has at least one functional group attached to the metallic atom of the organometallic compound, the functional group of which is reactive to inorganic and organic materials and represented by the formula -OR, wherein R is selected from the group consisting of hydrogen, hydrocarbyl, oxygen-containing hydrocarbyl, nitrogen-containing hydrocarbyl and oxygen- and nitrogen-containing hydrocarbyl.

18 Claims, 4 Drawing Sheets

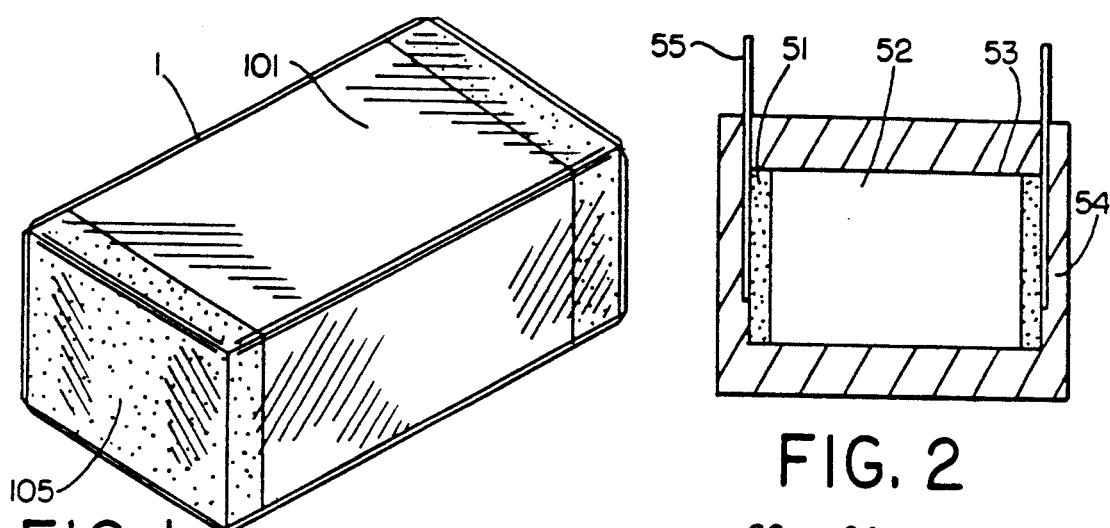
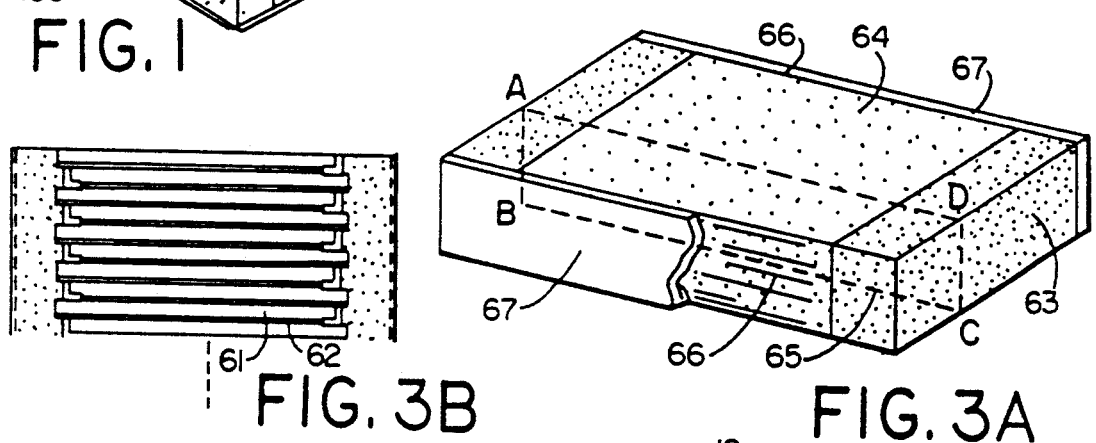
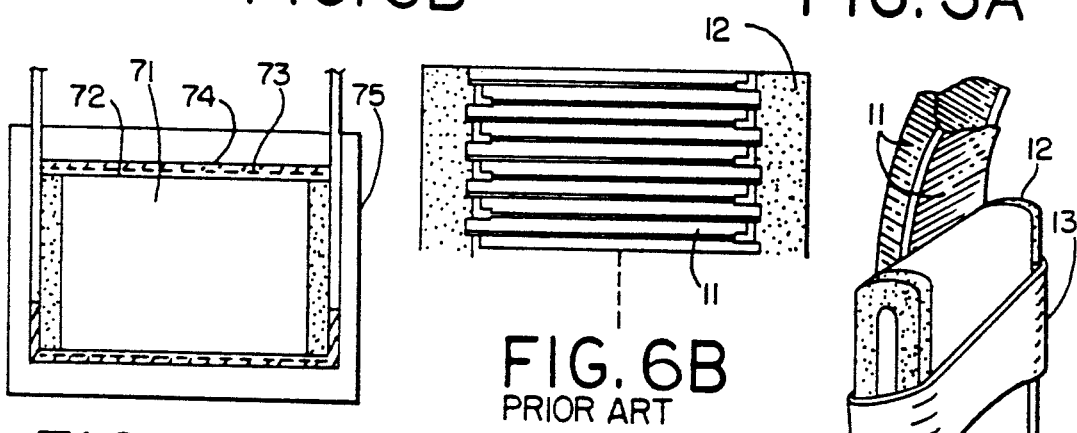
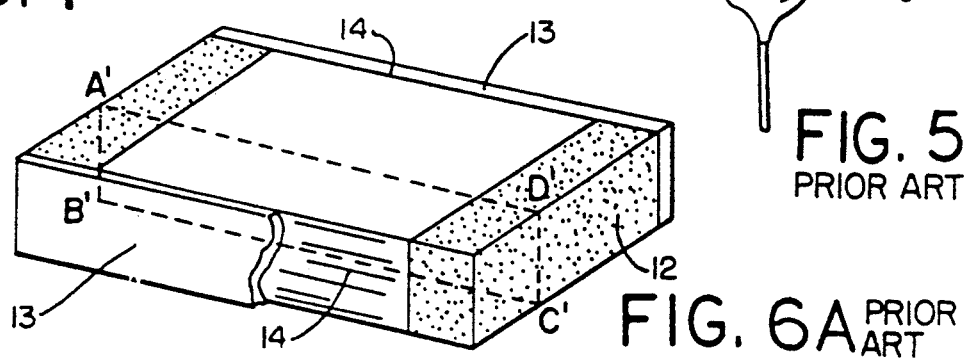

FILM CAPACITOR AND METHOD FOR MANUFACTURING THE SAME

BACKGROUND OF THE INVENTION

1. Field of the Invention

The present invention relates to a film capacitor having reliable and excellent moisture resistance, which is suitable as an electronic component used in electronic or electric appliances, and a method for manufacturing the same.

2. Description of the Related Art

A film capacitor is required to have improved moisture resistance to improve its performance as an electronic component. Also, studies are directed to make a film capacitor, as well as electronic components in general, smaller and lighter. Regarding the moisture resistance, a film capacitor has conventionally been rated under the condition of 40° C. and 95% relative humidity (RH). Recently, however, the moisture resistance of a film capacitor is required to be rated under more severe conditions, such as those of 60° C. and 95% RH, or 85° C. and 85% RH, or 121° C., 2 atmospheres and 100% RH (a condition of a pressure cooker test).

Among various film capacitors, there is known a metallized film capacitor which is made by forming a metallic layer on a surface of a dielectric base film and then stacking the thus metallized film. Because a metallized film capacitor has very thin metallic layers as electrodes and can be made small, it has found an increasing demand especially as an electronic component for industrial machines used under medium or high voltage. A metallized film capacitor, however, generally has a problem of poor moisture resistance and is far from satisfactory under the above-mentioned moisture conditions.

A metallized film capacitor includes a wound-type capacitor such as shown in FIG. 5, and a stacked-type capacitor such as shown in FIG. 6. Each of the capacitors can be manufactured in the following manner. First, a multilayer structure of either a wound metallized film or stacked metallized films is prepared. Then, a pair of outer electrodes 12 are formed on two side faces of the multilayer structure opposing to each other. For example outer electrodes are formed by the use of a metal spraying method, thereby obtaining a capacitor element. Finally, the capacitor element is either placed in an appropriate casing or covered otherwise, thereby yielding a desired capacitor.

In the manufacture of a stacked-type capacitor, the manufacturing procedure can be described more specifically as follows. First, metallized films having a rectangular shape are stacked to each other, thereby giving a multilayer structure. Second, a pair of outer electrodes are formed on two side faces of the multilayer structure opposing to each other, so as to cover the longer edges of the rectangular metallized films. Then, the thus obtained multilayer structure having a pair of outer electrodes is cleaved along the faces normal to the longer edges of the rectangular metallized films, thereby obtaining capacitor elements of specific sizes. Finally, the facets generated by the above-mentioned cleavages are generally covered by resin layers, thereby yielding desired stacked-type capacitors.

To the inside of the above-mentioned metallized film capacitors as shown in FIGS. 5, 6A and 6B, moisture penetrates easily through the outer electrodes 12, because these outer electrodes 12 have porous structures. The penetration of moisture also occurs easily through the dielectric films 11. In the stacked-type capacitor as shown in FIGS. 6A and 6B, each of facets 14, which is generated by the cleavage during the above-mentioned manufacturing process, is covered by a resin layer 13. The resin layer 13, however, can not completely prevent the penetration of moisture. The moisture that reaches the inside of the capacitor may be condensed, resulting in defects of the capacitor such as a decrease in the electric capacity.

In order to minimize the above-mentioned problem, the capacitor element of a metallized film capacitor has been either placed in a sealed resin casing or provided with a sufficiently thick resin layer as the resin layer 13. The resin layer 13 may be extended so as to cover the entire surface of the capacitor element.

FIG. 7 is a conceptual view showing a partial cross section of a stacked-type capacitor. The capacitor element of the stacked-type capacitor includes a multilayer structure made of metallic layers 15 and dielectric films 16, and outer electrodes 17 electrically connected to the metallic layers 15. A side face of the multilayer structure is covered by a resin layer 13 which is made of urethane resin or epoxy resin. In a conventional capacitor such as shown in FIG. 7, the resin layer 13 cannot completely prevent the penetration of moisture 21 from the outside of the capacitor. Once penetrated into the inside of the capacitor, moisture may be easily condensed according to the change in temperature, thereby giving water particles 22 and 23. These water particles 22 and 23 cause corrosion and elution of the metallic layers 15, resulting in a decrease in the electric capacity. Furthermore, the resin layer 13 which is in contact with the metallic layers 15 tends to be partially removed to give interspaces along the facet (i.e., cleaved surface) of the multilayer structure. These interspaces may collect the water particles 22 and 23, thereby accelerating the corrosion of the metallic layers 15. The facet of the multilayer structure is susceptible to corrosion especially when voltage is applied to the capacitor, because of the electrolytic reaction.

Regarding the size of the capacitor, a microminiature chip metallized film capacitor has been recently developed, which has a contact area of 3.2 mm × 1.6 mm with regard to a substrate on which the capacitor is to be mounted. In such a microminiature capacitor, a resin layer required to provide the capacitor with moisture resistance occupies a considerable volume of the capacitor, thereby preventing the further miniaturization of the capacitor.

Japanese Laid-Open Patent Publication No. 63-181409 discloses a method for coating a thin resin layer on the surface of a chip film capacitor except for the surface of the outer electrodes of the capacitor and for the surface of the capacitor which is to be in contact with a printed circuit board. Japanese Laid-Open Patent Publication No. 64-77911 discloses a method for forming resin layers on the two facets generated by the cleavage of a chip film capacitor. Japanese Laid-Open Patent Publication Nos. 64-77913, 64-77917 and 64-77920 disclose methods for fixing by heat and pressure a specific sheet material as a coating layer on the surface of a capacitor. Japanese Laid-Open Patent Publication No. 2-43718 discloses a method for applying and curing a resin layer on the facet of a capacitor. According to these methods, the volume of the coating-layer of a chip film capacitor can be made significantly small.

As a metallized film capacitor is further miniaturized, precise operation becomes more difficult for coating a resin sheet thereon or applying a resin solution thereto. With regard to productivity, an advantageous coating method would be, for example, a method of immersing a number of capacitor elements at the same time into a resin solution. This coating method, however, cannot be employed for the manufacture of a chip film capacitor, because the resin layer is required to be formed only on specific faces including the facets of the capacitor, without covering the outer electrodes of the capacitor.

SUMMARY OF THE INVENTION

The film capacitor of this invention comprises: a capacitor element having (a) a multilayer structure made of stacked dielectric films or a wound dielectric film, each dielectric film having a metallic layer formed on its surface, and (b) a pair of outer electrodes electrically connected to the metallic layer; and a coating layer covering at least facets of the multilayer structure of the capacitor element, the coating layer being made from at least one polysiloxane, at least one organometallic compound or a combination of the polysiloxane and the organometallic compound, the organometallic compound being selected from the group consisting of organoaluminum compound, organosilicon compound, organotin compound and organotitanium compound; and wherein the organometallic compound has at least one functional group attached to the metallic atom of the organometallic compound, the functional group being reactive to inorganic or organic materials and represented by the formula -OR, R being selected from the group consisting of hydrogen, hydrocarbyl, oxygen-containing hydrocarbyl, nitrogen-containing hydrocarbyl and oxygen- and nitrogen-containing hydrocarbyl.

The method for manufacturing a film capacitor of this invention comprises the steps of: preparing a capacitor element having (a) a multilayer structure made of stacked dielectric films or a wound dielectric film, each dielectric film having a metallic layer formed on its surface, and (b) a pair of outer electrodes electrically connected to the metallic layer; and providing at least facets of the multilayer structure with a coating material so as to form a coating layer, the coating material containing at least one polysiloxane, at least one organometallic compound or a combination of the polysiloxane and the organometallic compound, the organometallic compound being selected from the group consisting of organoaluminum compound, organosilicon compound, organotin compound and organotitanium compound; and wherein the organometallic compound has at least one functional group attached to the metallic atom of the organometallic compound, the functional group being reactive to inorganic or organic materials and represented by the formula -OR, R being selected from the group consisting of hydrogen, hydrocarbyl, oxygen-containing hydrocarbyl, nitrogen-containing hydrocarbyl and oxygen- and nitrogen-containing hydrocarbyl.

Thus, the invention described herein makes possible the advantages of (1) providing a film capacitor having excellent moisture resistance; (2) providing a microminiature chip film capacitor having excellent moisture resistance, which includes outer electrodes having improved wettability for solder; and (3) providing a method for manufacturing the above capacitors in a manner convenient and suitable for mass production.

These and other advantages of the present invention will become apparent to those skilled in the art upon reading and understanding the following detailed description with reference to the accompanying figures.

BRIEF DESCRIPTION OF THE DRAWINGS

FIG. 1 is a perspective view illustrating an embodiment of the film capacitor according to the present invention which is a chip film capacitor obtained in Example 1.

FIG. 2 is a schematic sectional view illustrating an embodiment of the film capacitor according to the present invention.

FIG. 3A is a partially cutaway perspective view illustrating an embodiment of the film capacitor according to the present invention.

FIG. 3B is a sectional view, taken on section lines A-B-C-D of FIG. 3A.

FIG. 4 is a schematic sectional view illustrating an embodiment of the film capacitor according to the present invention.

FIG. 5 is a partially cutaway perspective view illustrating a conventional wound-type film capacitor.

FIG. 6A is a partially cutaway perspective view illustrating a conventional stacked-type film capacitor.

FIG. 6B is a sectional view, taken on section lines A'-B'-C'-D' of FIG. 6A.

DESCRIPTION OF THE PREFERRED EMBODIMENTS

Figure 7:
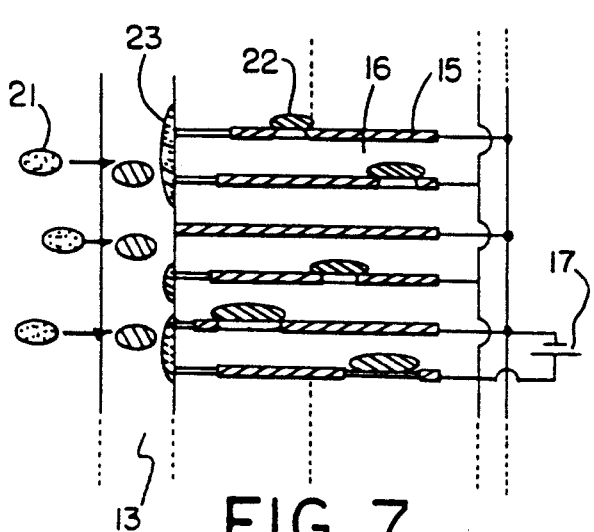
FIG. 7 is a conceptual view illustrating corrosion of metallic layers of a conventional stacked-type film capacitor.

In the film capacitor of this invention, resin films such as those generally used for a film capacitor are used as a dielectric base film for a metallized film. Examples of the suitable resin films include polyester resin film, polypropylene resin film, polyphenylene resin film and laminate films made of a combination thereof. Although this invention is not limited regarding the material of the dielectric base film, polyester resin film is preferably used. Further, this invention is not limited regarding the thickness of the dielectric base film. However, the thickness of the dielectric base film is normally 0.1-30 μm, and preferably 0.6-15 μm.

In this invention, a metallized film means a film prepared by forming a metallic layer on at least one side of the above-mentioned dielectric base film. The material of the metallic layer can be aluminum or zinc which are generally used as electrodes of a film capacitor. Neither the method for forming the metallic layer nor the thickness of the metallic layer is limited. Available methods for forming the metallic layer include vacuum evaporation, sputtering and ion-plating. Thickness of the metallic layer is normally 200-1000 Å, and preferably 250-700 Å.

The coating material used for the film capacitor of this invention is divided into two classes. The first class is polysiloxane represented generally by Formula I.

(Formula I)

In Formula I, $R_1$, $R_2$, $R_3$ and $R_4$ are independently hydrogen, alkyl, phenyl, hydroxyl, oxygen-containing hydrocarbyl, nitrogen-containing hydrocarbyl, oxygen- and nitrogen-containing hydrocarbyl or siloxanyl (substituent derived from silicone); and n is an integer of 2 or more. More specifically, $R_1$, $R_2$, $R_3$ and $R_4$ include vinyl, alkoxy, acyloxy such as acetoxy, epoxyl, amino, acryloyl, methacryloyl, epoxy such as glycidoxyalkyl, silanol, isocyanate, an organic moiety containing a hydroxy group and an organic moiety containing a carboxy group.

Polysiloxane of Formula I includes methylhydrogenpolysiloxane, dimethylpolysiloxane and the like. The polysiloxane itself can polymerize to form a silicone resin having a cross-linked network structure. Furthermore, the polysiloxane can polymerize with an another reactive resin to form a copolymer (i.e. a denatured silicone resin). The reactive resin includes alkyd resin, polyester resin, epoxy resin, amide resin, imide resin, fluoride-contained resin, urethane resin and acrylic resin.

The second class is an organometallic compound which has at least one functional group attached to the metallic atom of the organometallic compound. This functional group is represented by the formula -OR, where R is hydrogen, hydrocarbyl, nitrogen-containing hydrocarbyl, oxygen-containing hydrocarbyl and oxygen- and nitrogen-containing hydrocarbyl. The above organometallic compound includes organoaluminum compounds, organosilicon compounds, organotin compounds and organotitanium compounds, and is represented generally by Formula II.

$$(R_5)_{n-m}M(OR_6)_m \quad \text{(Formula II)}$$

In Formula II, M is a metallic atom which is aluminum, silicon, tin or titanium; m is an integer of 1, 2, 3 or 4 with the proviso of m≦n; n is 3 when M is aluminum, or 4 when M is silicon, tin or titanium; and $R_5$ and $R_6$ are independently hydrogen, hydrocarbyl, oxygen-containing hydrocarbyl, nitrogen containing hydrocarbyl and oxygen- and nitrogen-containing hydrocarbyl. More specifically, $R_5$ and $R_6$ include vinyl, alkoxy, acyloxy such as acetoxy, epoxyl, amino, acryloyl, methacryloyl, expoxy such as glycidoxyalkyl, silanol, isocyanate, an organic moiety containing a hydroxy group, an organic moiety containing a carboxy group.

The organoaluminum compounds of Formula II include aluminum triethoxide, aluminum triisopropoxide, derivatives thereof, and polymers thereof. The organosilicon silicon compounds of Formula II include dimethyldimethoxysilane, vinyltrimethoxysilane, methyltriethoxysilane, hexyltrimethoxysilane, methyltrimethoxysilane, tetramethoxysilane, tetraethoxysilane, methylhydrogendimethoxysilane, dimethylvinylethoxysilane, diphenyldimethoxysilane, gamma-(2-aminoethyl)aminopropyltrimethoxysilane, gamma-(2-aminoethyl)aminopropylmethyldimethoxysilane, gamma-methacryloxypropyltrimethoxysilane, gamma-glycidoxypropyltrimethoxysilane, gamma-mercaptopropyltrimethoxysilane, vinyltriacetoxysilane, gamma-anilinopropyltrimethoxysilane, derivatives thereof, and polymers thereof. The organotin compounds of Formula II include tin tetra-n-butoxide, derivatives thereof, and polymers thereof. The organotitanium compounds of Formula II include titanium tetraisopropoxide, titanium tetra-n-butoxide, titanium tetrakis(2-ethylhexoxide), titanium diisopropoxide bis(acetylacetonate), titanium di-n-butoxide bis(triethanolaminate), derivatives thereof, and polymers thereof.

The coating material used for the film capacitor of this invention may contain an additional compound which can be cured by UV irradiation, thereby yielding a coating material which as a whole can be cured by UV irradiation. A coating layer having desired hardness can be obtained from a coating material containing an appropriate compound.

Figure 9:
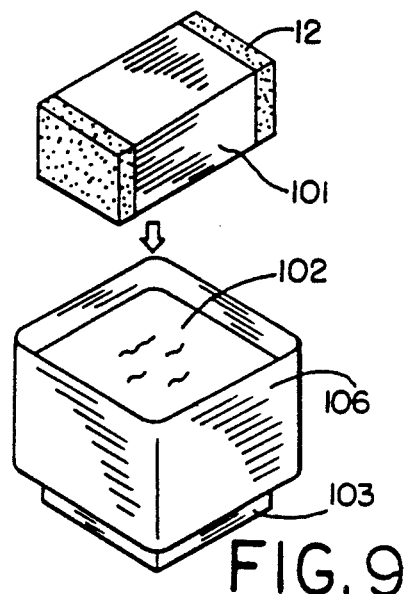
FIG. 9 is a schematic representation illustrating a step of providing a capacitor element with a coating material according to an embodiment of the manufacturing method of the present invention.
Figure 10:
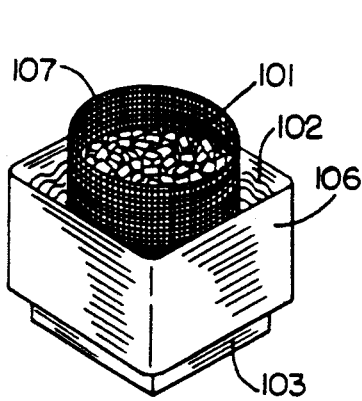
FIGS. 10, 11 and 12 are schematic representations illustrating a step of providing a capacitor element with a coating material, which includes a immersing step, according to an embodiment of the manufacturing method of the present invention.
Figure 11:
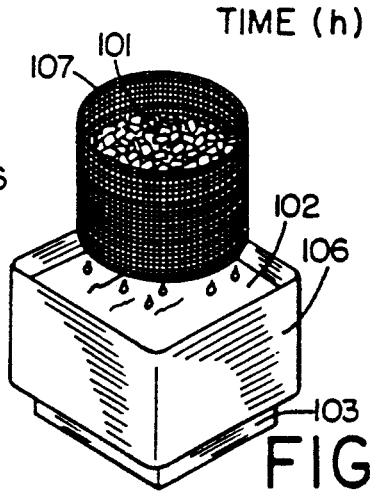
Figure 12:
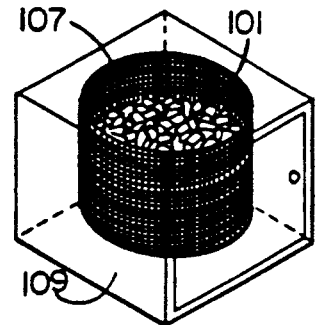

The film capacitor of this invention can be manufactured in the following manner. First, a metallic layer is formed at least on one side of the above-mentioned dielectric base film, thereby yielding a metallized film. Second, the metallized film is stacked by the conventional method into a multilayer structure. Next, A pair of outer electrode 12 were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films, thereby yielding a capacitor element 101 as shown in FIG. 9. This capacitor element 101 is then immersed into a solution 102 containing the above-mentioned coating material such as organosilicon compound, or the other organometallic compound. Appropriate solvent for dissolving the coating material includes an inert solvent such as n-heptane, toluene, xylene or trichlorofluoroethane, and an organometallic compound such as methyltrimethoxysilane. The above immersing step may be effectively carried out, as shown in Figure 10, by placing a number of the capacitor elements 101 in a cage 107, and then immersing the cage 107 into the solution 102. An ultrasonic vibrator 103 may be used during the immersing step so as to facilitate contact between the entire surfaces of the capacitor elements 101 and the solution 102. In this ultrasonic treatment, the solution 102 may penetrate even into a part of the multilayer structure of the capacitor element 101. The solution 102 has preferably a viscosity at 25° C. of not more than $3.2 \times 10^{-3}$ Pa.s preferably, not more than $2 \times 10^{-3}$ Pa.s (0.02 poise), so as to assure formation on the surface of the capacitor element 101 of an extremely thin coating layer such as a monomolecular layer. The immersing step is followed, as shown in FIG. 11, by a step of withdrawing the cage 107 from the solution 102 so as to remove excessive coating material. Then, the capacitor element 101 having the coating solution on its surface may be heat-treated, as shown in FIG. 12, at 100° C.-200° C., for example, in an air circulating-type thermostat controlled oven 109 so as to cure the coating material into a coating layer. When the coating material includes the organometallic compound, this heat-treatment allows formation of a chemical bond between the metallic atom of the organometallic compound and the surface of the capacitor element 101. When the coating material includes the polysiloxane having a reactive functional group, the heat-treatment results in the same type of chemical bond formation. In addition, when the organometallic compound or the polysiloxane has a hydrophobic group, this chemical bond formation places the hydrophobic group within the coating layer on the opposite side from the surface of the capacitor element 101. The above heat-treatment also allows evaporation of any excessive coating material which may slightly remain in an interspace between the two capacitor elements because of surface tension. In this way, the coating layer is formed on the entire surface of each of the capacitor elements 101 which includes the surface of the outer electrodes 12. The coating layer may be also formed on a surface of the cage 107. Because these coating layers are substantially monomolecular layers which are extremely thin, the curing process in the heat-treatment does not cause adhesion between the capacitor element 101 and the cage 107, or adhesion among each of the capacitor elements. Thus, the coated capacitor elements can be easily recovered from the cage 107.

The manufacturing method of this invention is suitable for mass-production of the film capacitor, because the manufacturing method may include a step, such as the above-mentioned immersing step, in which a number of capacitor elements can be coated at once.

In addition, the manufacturing method of this invention enables formation of an extremely thin coating layer on a film capacitor element, which may be several microns in the thickness. The thickness of the coating layer can be controlled, for example, by changing the concentration of the solution containing the coating material. Such an extremely thin coating layer would greatly facilitate miniaturization of the capacitor, because the coating layer can occupy a minimal, or even negligible volume of the capacitor.

As mentioned above, the manufacturing method of this invention uses coating material including the polysiloxane or the organometallic compound. The use of these specific coating materials results in close contact between the resulting coating layer and the surface of e capacitor element. For example, the organometallic compound can be chemically bound to the surface of the capacitor element, which includes surfaces of the metallic layer, the dielectric film and the outer electrodes of the capacitor element. Also, the polysiloxane has a high degree of affinity to the surface of the capacitor element. This affinity is especially high when the dielectric film of the capacitor element is made of a polyester resin film, such as polyethylene naphthalate or polyethylene terephthalate.

The above organometallic compound can form a polymer having a cross-linked structure, resulting in a microporous coating layer on the surface of the capacitor element. Through this microporous coating layer, moisture penetrates easily. The above polysiloxane, especially silicone resin and denatured silicone resin, may have cross-linked Si-O bonds within the polymer molecule. Thus, the polysiloxane can also form a microporous coating layer, micropores of which have larger diameters than a water molecule. The microporous coating layers formed in the above manners are advantageous in that even if moisture has once reached the inside of the capacitor element, it is readily released to the outside. The coating layer may be highly hydrophobic, for example, when it is made of the polysiloxane having cross-linked Si-O bonds. In addition, as mentioned above, the coating-layer of the film capacitor of this invention is placed in close contact to the surface of the capacitor element. Therefore, the film capacitor of this invention hardly suffers from adverse effects of penetration and condensation of moisture, such as deterioration of its performance.

EXAMPLE 1

FIG. 1 illustrates an embodiment of the film capacitor according to the present invention.

An aluminum layer having a thickness of approximately 500 Å was formed on a polyphenylene sulfide film having a thickness of approximately 2.0 μm by vacuum evaporation, thereby giving a metallized polyphenylene sulfide film. This metallized film was stacked into a multilayer structure. A pair of outer electrode 105 were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films, thereby giving a film capacitor element 101. As shown in FIG. 10, a number of the capacitor elements 101 obtained in this manner were placed in a cage 107, which was then placed in a bath 106 having a solution 102 containing methyltrimethoxysilane, thereby immersing the capacitor elements 101 into the solution 102. The concentration of methyltrimethoxysilane in the solution 102 had been adjusted so that the solution 102 had a viscosity at 25° C. of about $0.7 \times 10^{-3}$ Pa.s. During the immersing step, the solution 102 was vibrated from the outside by the use of an ultrasonic vibrator 103 so as to facilitate contact between the entire surfaces of the capacitor elements 101 and the solution 102. After the immersing step, as shown in FIG. 11, the cage 107 was withdrawn from the solution 102, thereby removing easily an excess amount of the solution of methyltrimethoxysilane. Then, as shown in FIG. 12, the cage 107 having the capacitor elements 101 was transferred into an air circulating-type thermostat controlled oven 109 heated at a temperature between 100° C. and 200° C., thereby curing the methyltrimethoxysilane adhering to the entire surfaces of the capacitor elements 101. This heating step also allowed evaporation of any excess amount of methyltrimethoxysilane which had remained slightly in interspaces between the capacitor elements 101 because of surface tension. The methyltrimethoxysilane adhering to the entire surfaces of the capacitor elements 101, which include the surfaces of the outer electrodes 105, formed extremely thin layers 1 as shown in FIG. 1. Therefore, the curing process in the heating step did not cause undesirable adhesion among each of the capacitor elements 101.

EXAMPLE 2

FIG. 2 illustrates another embodiment of the film capacitor according to the present invention.

A metallized film having a thickness of approximately 2.0 μm was prepared by evaporating an aluminum layer on a polyethylene naphthalate (PEN) film. This metallized film was stacked into a multilayer structure, a pair of outer electrodes were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films. Then, a lead 55 was attached to each of the outer electrodes 51, thereby giving a film capacitor element 52. This capacitor element 52 was then immersed into a solution containing methylhydrogenpolysiloxane. The immersing step was followed by a heat-treatment at 150° C. for 1 hour, thereby forming a coating layer 53 made of silicone resin on the surface of the capacitor element. This coated capacitor element was further covered by an epoxy resin layer 54 having a thickness of 0.5 min.

EXAMPLE 3

FIGS. 3A and 3B illustrate still another embodiment of the film capacitor according to the present invention.

A metallized film having a thickness of approximately 3.5 μm was prepared by evaporating an aluminum layer 62 on a polyethylene naphthalate (PEN) film 61. This metallized film was stacked into a multilayer structure, a pair of outer electrodes 63 were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films, thereby giving a film capacitor element 64 of a surface mount-type. This capacitor element 64 was subjected to a heat aging at a temperature of 220° C. or more, so that the capacitor element 64 was applicable to a reflow soldering operation. Then, a solution containing methylhydrogenpolysiloxane was applied to exposed facets 66 of the capacitor element 64, which were also cleaved surfaces of the multilayer structure. By heat-treating the capacitor element 64 at 150° C. for 1 hour, coating layers 65 made of silicone resin were formed on the facets 66. These coated facets 66 were further covered by epoxy resin layers 67 each having a thickness of 0.05 mm.

EXAMPLE 4

The procedure of Example 3 was followed except that resin layers were not formed on the coated facets.

EXAMPLE 5

The procedure of Example 2 was followed except that addition-polymerizable silicone was used as a coating material instead of methylhydrogenpolysiloxane. This film capacitor had a coating layer made of cross-linked dimethylpolysiloxane having a thickness of approximately 0.05 mm, and a resin layer having a thickness of approximately 0.5 mm.

EXAMPLE 6

The procedure of Example 3 was followed except that addition-polymerizable-silicone was used as a coating material instead of methylhydrogenpolysiloxane. A coating layer made of cross-linked dimethylpolysiloxane of this film capacitor had a thickness of approximately 0.05 mm.

EXAMPLE 7

The procedure of Example 4 was followed except that dimethylpolysiloxane was used as a coating material instead of methylhydrogenpolysiloxane.

EXAMPLE 8

Still another embodiment of the film capacitor according to the present invention was obtained in the following manner.

A metallized film having a thickness of approximately 3.5 μm was prepared by evaporating an aluminum layer on a polyethylene naphthalate (PEN) film. This metallized film was stacked into a multilayer structure, a pair of outer electrodes were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films, thereby giving a film capacitor element of surface mount-type. This capacitor element was then immersed into a n-heptane solution containing 5 wt % of addition-polymerizable-silicone. After being air-dried at room temperature for 30 min, the immersed capacitor element was heat-treated at 150° C. for 1 hour, thereby forming a coating layer made of cross-linked dimethylpolysiloxane on the surface of the capacitor element. The coating layer had a thickness of approximately 2 μm.

EXAMPLE 9

FIG. 4 illustrates still another embodiment of the film capacitor according to the present invention.

A metallized film having a thickness of approximately 2.0 μm was prepared by evaporating an aluminum layer on a polyethylene naphthalate (PEN) film. This metallized film was stacked into a multilayer structure, a pair of outer electrodes were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films. Then, a lead was attached to each of the outer electrodes, thereby giving a film capacitor element 71. An addition-polymerizable silicone was applied to exposed facets 72 of the capacitor element 71, which were also cleaved surfaces of the multilayer structure. By heat-treating the capacitor element 71 at 150° C. for 1 hour, coating layers 73 made of a denatured silicone obtained by the reaction of an addition-polymerizable silicone with a epoxy group were formed on the facets 72. These coated facets 72 were further covered by epoxy resin layers 74 having a thickness of 0.05 mm. Then, the thus obtained film capacitor was inserted in the box 75 of polycarbonate resign.

EXAMPLE 10

The procedure of Example 2 was followed except that hexyltrimethoxysilane was used as a coating material instead of methylhydrogenpolysiloxane.

EXAMPLE 11

The procedure of Example 3 was followed except that methyltriethoxysilane was used as a coating material instead of methylhydrogenpolysiloxane.

EXAMPLE 12

The procedure of Example 4 was followed except that methyltriethoxysilane was used as a coating material instead of methylhydrogenpolysiloxane.

EXAMPLE 13

The procedure of Example 2 was followed except that titanium diisopropoxide bis(acetylacetonate) was used as a coating material instead of methylhydrogenpolysiloxane.

EXAMPLE 14

The procedure of Example 3 was followed except that titanium diisopropoxide bis(acetylacetonate) was used as a coating material instead of methylhydrogenpolysiloxane.

EXAMPLE 15

The procedure of Example 4 was followed except that titanium diisopropoxide bis(acetylacetonate) was used as a coating material instead of methylhydrogenpolysiloxane.

EXAMPLE 16

The procedure of Example 2 was followed except that a polymer of titanium tetra-n-butoxide was used as a coating material instead of methylhydrogenpolysiloxane.

EXAMPLE 17

The procedure of Example 3 was followed except that a polymer of titanium tetra-n-butoxide was used as a coating material instead of methylhydrogenpolysiloxane.

EXAMPLE 18

The procedure of Example 4 was followed except that a polymer of titanium tetra-n-butoxide was used as a coating material instead of methylhydrogenpolysiloxane.

EXAMPLE 19

The procedure of Example 2 was followed except that aluminum triisopropoxide was used as a coating material instead of methylhydrogenpolysiloxane.

EXAMPLE 20

The procedure of Example 3 was followed except that aluminum triisopropoxide was used as a coating material instead of methylhydrogenpolysiloxane.

EXAMPLE 21

The procedure of Example 4 was followed except that aluminum triisopropoxide was used as a coating material instead of methylhydrogenpolysiloxane.

EXAMPLE 22

The procedure of Example 2 was followed except that tin tetra-n-butoxide was used as a coating material instead of methylhydrogenpolysiloxane.

EXAMPLE 23

The procedure of Example 3 was followed except that tin tetra-n-butoxide was used as a coating material instead of methylhydrogenpolysiloxane.

EXAMPLE 24

The procedure of Example 4 was followed except that tin tetra-n-butoxide was used as a coating material instead of methylhydrogenpolysiloxane.

COMPARATIVE EXAMPLE 1

A metallized film having a thickness of approximately 2.0 $\mu$m was prepared by evaporating an aluminum layer on a polyethylene naphthalate (PEN) film. This metallized film was stacked into a multilayer structure, a pair of outer electrode were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films. Then, a lead was attached to each of the outer electrodes, thereby giving a film capacitor element. The entire surface of this capacitor element was covered by an epoxy resin layer having a thickness of 0.5 mm.

COMPARATIVE EXAMPLE 2

A metallized film having a thickness of approximately 3.5 $\mu$m was prepared by evaporating an aluminum layer on a polyethylene naphthalate (PEN) film. This metallized film was stacked into a multilayer structure, a pair of outer electrode were formed on two side faces of the multilayer structure opposing to each other, so as to cover the longer edges of the metallized films, by a metal spraying method. Then, the thus obtained multilayer structure having a pair of outer electrodes was cleaved along the faces normal to the longer edges of the rectangular metallized films, thereby giving a film capacitor element of a surface mount-type. This capacitor element was subjected to heat aging at a temperature of 220° C. or more, so that the capacitor element was applicable to a reflow soldering operation. The entire surface of this capacitor element was covered by an epoxy resin layer having a thickness of 0.05 mm.

COMPARATIVE EXAMPLE 3

The procedure of Comparative Example 2 was followed except that a resin layer was not formed on the capacitor element, which itself was used as a film capacitor.

Test 1

A moisture resistance test was performed for the film capacitors of Examples 2 through 24, and for those of Comparative Examples 1 through 3. In this test, DC voltage of 100 V was applied to each film capacitor under the conditions of 85° C. and 85% RH, and variation per hour of the electric capacity of each film capacitor was followed. For each of the Examples and Comparative Examples, the result was obtained from the average electric capacity of 12 samples.

Figure 8:
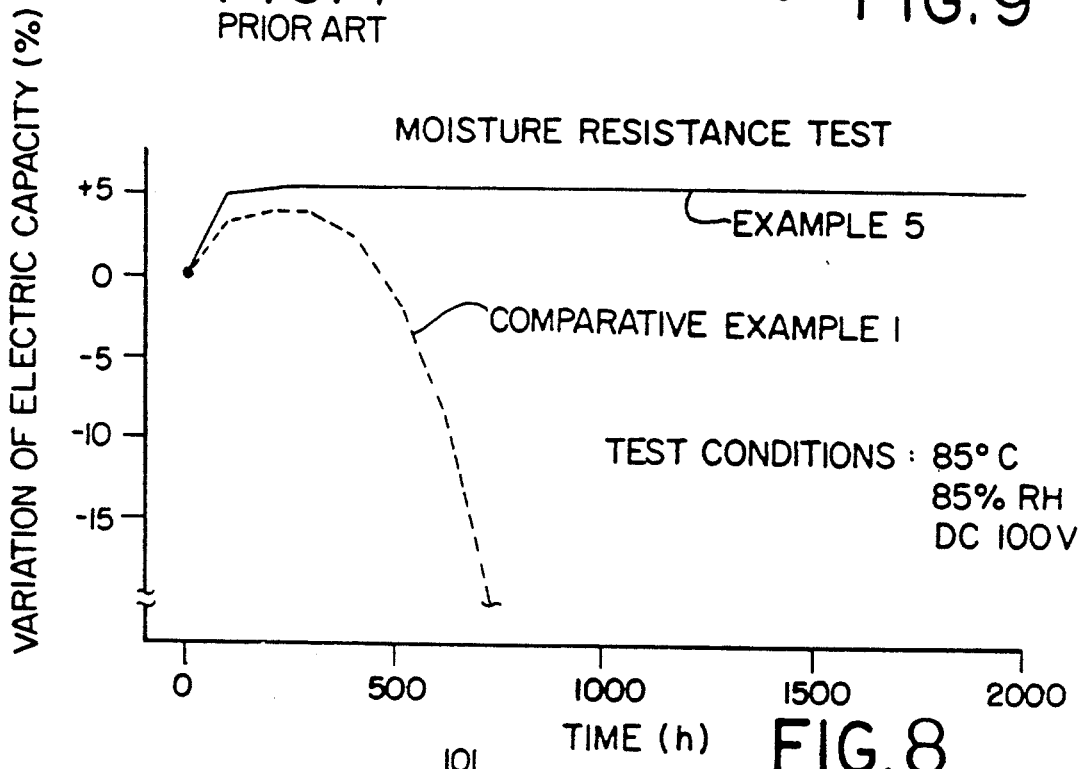
FIG. 8 is a graph illustrating the result of a moisture resistance test, which was performed for film capacitors obtained in Example 5 and Comparative example 1.

FIG. 8 compares the result obtained for the film capacitor of Example 5, which has a coating layer of cross-linked dimethylpolysiloxane and an epoxy resin layer, and that of Comparative Example 1, which has only an epoxy resin layer.

Tables 1, 2 and 3 show the average time for each film capacitor for the variation rate to reach −5% (Hours).

TABLE 1

|  | The average time for the variation rate to reach −5% (Hours) |
| --- | --- |
| Example 2 | 1500 |
| Example 5 | ≧2000 |
| Example 9 | ≧2000 |
| Example 10 | 1750 |
| Example 13 | 1500 |
| Example 16 | 1500 |
| Example 19 | 1250 |
| Example 22 | 1250 |
| Comparative Example 1 | 600 |

TABLE 2

|  | The average time for the variation rate to reach −5% (Hours) |
| --- | --- |
| Example 3 | 1250 |
| Example 6 | ≧2000 |
| Example 11 | 1500 |
| Example 14 | 1500 |
| Example 17 | 1250 |
| Example 20 | 1000 |
| Example 23 | 1000 |
| Comparative Example 2 | 500 |

TABLE 3

|  | The average time for the variation rate to reach −5% (Hours) |
| --- | --- |
| Example 4 | 1000 |
| Example 7 | 800 |
| Example 8 | 1750 |
| Example 12 | 1000 |
| Example 15 | 900 |
| Example 18 | 800 |
| Example 21 | 700 |
| Example 24 | 700 |
| Comparative Example 3 | 300 |

As seen from the results shown in FIG. 8 and Tables 1, 2 and 3, formation of a coating layer of polysiloxane or organometallic compound greatly improves the moisture resistance of a film capacitor.

COMPARATIVE EXAMPLE 4

An aluminum layer having a thickness of approximately 500 Å was formed on a polyphenylene sulfide film by vacuum evaporation, thereby giving a metallized polyphenylene sulfide film. This metallized film was stacked into a multilayer structure, a pair of outer electrode were formed on two side faces of the multilayer structure opposing to each other, so as to cover the longer edges of the metallized films, by a metal spraying method. Then, the thus obtained multilayer structure having a pair of outer electrodes was cleaved along The faces normal to the longer edges of the rectangular metallized films, thereby giving a film capacitor element. On exposed facets of this capacitor element, which were also cleaved surfaces of the multilayer structure, coating layers made of a UV-curing resin were formed according to the method disclosed in Japanese Laid-Open Patent Publication No. 2-43718.

COMPARATIVE EXAMPLE 5

The procedure of Comparative Example 4 was followed except that a resin layer was not formed on the capacitor element, which itself was used as a film capacitor.

Test 2

A Moisture resistance test was performed for the film capacitors of Example 1 and Comparative Examples 4 and 5. In this test, a DC voltage of 16 V was applied to each film capacitor under the conditions of 60° C. and 95% RH, and variation per hour of the electric capacity of each film capacitor was followed.

Figure 13:
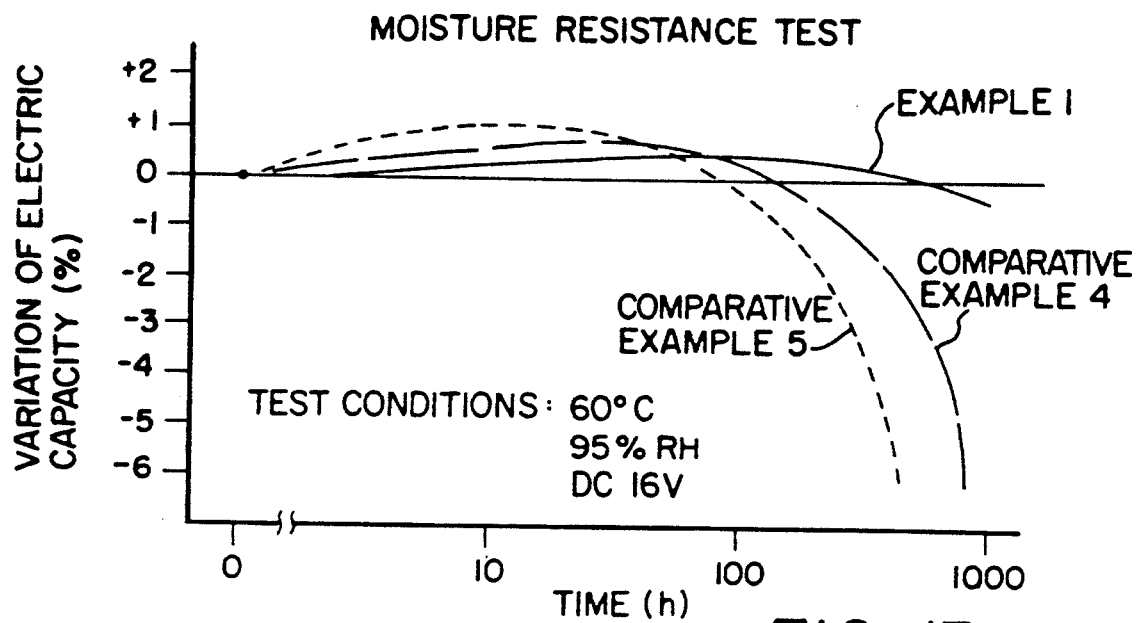
FIG. 13 is a graph illustrating the result of a moisture resistance test, which was performed for film capacitors obtained in Example 1 and Comparative examples 4 and 5.

FIG. 13 shows the results obtained for these film capacitors. As seen from FIG. 13, the film capacitor of Example 1, which has a coating layer made from methyltrimethoxysilane, has greatly improved moisture resistance as compared with the film capacitors of Comparative Examples 4 and 5.

Then, a soldering test was performed for the film capacitors of Example 1 and Comparative Examples 4 and 5. In this test, each film capacitor was subjected to reflow soldering by solder paste within a hot-air reflow furnace at the maximum temperature of 230° C. For each of Example 1 and Comparative Examples 4 and 5, 5000 samples were soldered.

Table 4 shows the result of the soldering test. As seen from Table 4, no soldering failure was found for any of the film capacitors.

TABLE 4

|  | The rate of soldering failure |
| --- | --- |
| Example 1 | 0% |
| Comparative Example 4 | 0% |
| Comparative Example 5 | 0% |

Further, a soldering wettability test was performed for the film capacitors of Example 1 and Comparative Examples 4 and 5. In this test, each film capacitor was placed in a solder bath heated at 230° C., and the time required for the film capacitor to become free from stress given by melted solder was measured by the use of meniscograph. For each of Example 1 and Comparative Examples 4 and 5, 50 samples were tested.

Figure 14:
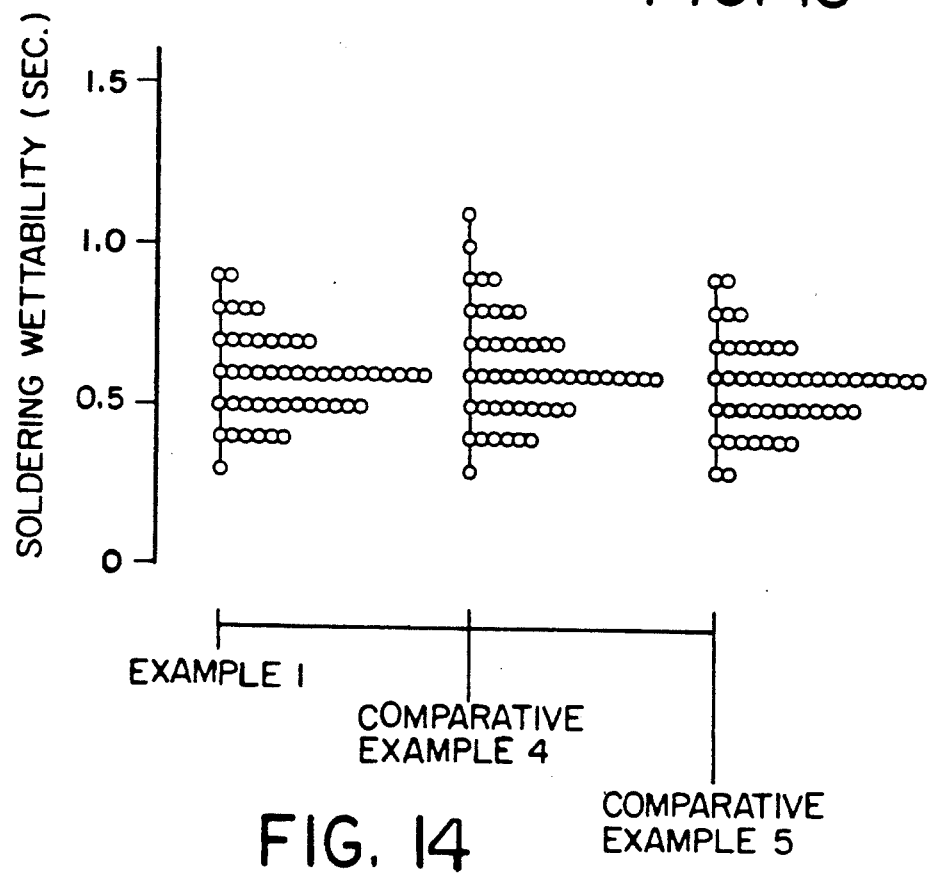
FIG. 14 is a graph illustrating the result of a soldering wettability test, which was performed by using solder meniscograph for film capacitors obtained in Example 1 and Comparative examples 4 and 5.

FIG. 14 shows the result of the soldering wettability test. As seen from FIG. 14, all of the film capacitors showed excellent soldering wettability.

EXAMPLE 25

The procedure of Example 1 was followed except that 5 wt % of an addition-polymerizable silicone was added to the solution containing methyltrimethoxysilane. This addition-polymerizable silicone can form cross-linked dimethylpolysiloxane by heat-treatment. The solution used in this Example had a viscosity at 25° C. of $3.2 \times 10^{-3}$ Pa.s as measured by a coneplate-type viscometer.

EXAMPLE 26

The procedure of Example 25 was followed except that 3 wt % of the addition-polymerizable silicone was added to the solution containing methyltrimethoxysilane. The solution used in this Example had a viscosity at 25° C. of 2.2×10⁻³ Pa.s as measured by a coneplate-type viscometer.

EXAMPLE 27

The procedure of Example 25 was followed except that 1 wt % of the addition-polymerizable silicone was added to the solution containing methyltrimethoxysilane. The solution used in this Example had a viscosity at 25° C. of 1.5×10⁻³ Pa.s as measured by coneplate-type viscometer.

Test 3

Figure 15:
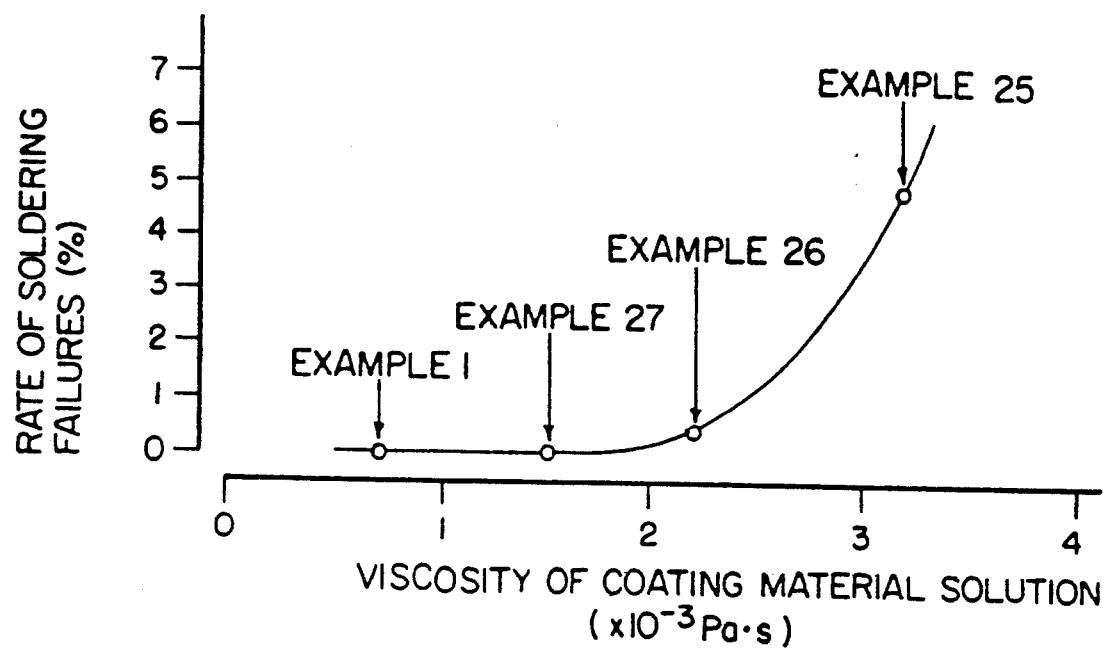
FIG. 15 is a graph illustrating the result of a reflow soldering test, which was performed for film capacitors obtained in Examples 1, 25, 26 and 27.
Figure 16:
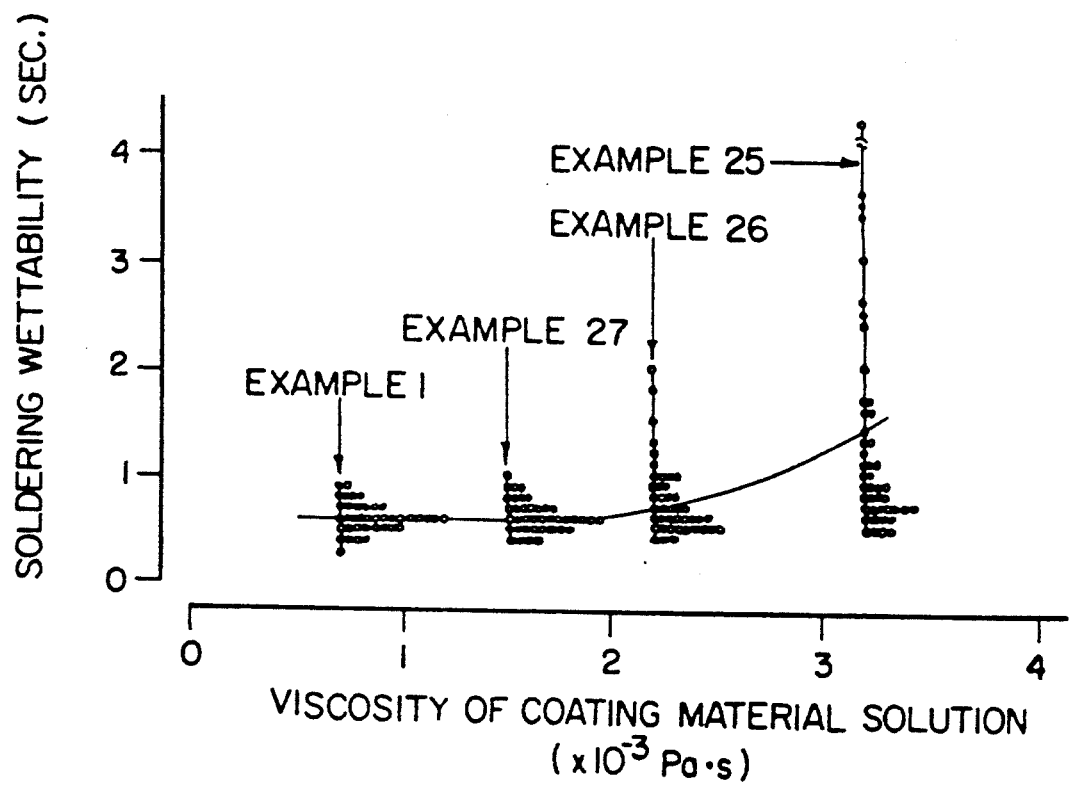
FIG. 16 is a graph illustrating the result of a soldering wettability test, which was performed by using for film capacitors obtained in Examples 1, 25, 26 and 27.

A soldering test and a soldering wettability test were performed for the film capacitors of Examples 1, 25, 26 and 27 in the same manner as described in Test 2. FIGS. 15 and 16 respectively show the results of each test. As seen from FIGS. 15 and 16, the film capacitors of Examples 1, 25, 26, and 27 especially the ones using a coating material solution having a viscosity of 2.0×10⁻³ Pa.s or less at 25° C., have satisfactory soldering efficiency and soldering wettability.

Various other modifications will be apparent to and can be readily made by those skilled in the art without departing from the scope and spirit of This invention. Accordingly, it is not intended that The scope of the claims appended hereto be limited to the description as set forth herein, but rather that the claims be broadly construed.

What is claimed is:

1. A film capacitor comprising:
   a capacitor element having (a) a multilayer structure made of stacked dielectric films or a wound dielectric film, each dielectric film having a metallic layer formed on its surface, and (b) a pair of outer electrodes electrically connected to the metallic layer; and
   a coating layer covering at least facets of the multilayer structure of the capacitor element, the coating layer being made from at least one polysiloxane, at least one organometallic compound or a combination of the polysiloxane and the organometallic compound, the organometallic compound being selected from the group consisting of organoaluminum compounds, organosilicon compounds, organotin compounds and organotitanium compounds; and
   wherein the organometallic compound has at least one functional group attached to the metallic atom of the organometallic compound, the functional group being reactive to inorganic or organic materials and represented by the formula -OR, R being selected from the group consisting of hydrogen, hydrocarbyl, oxygen-containing hydrocarbyl, nitrogen-containing hydrocarbyl and oxygen- and nitrogen-containing hydrocarbyl.

2. The film capacitor according to claim 1, further comprising a resin layer covering the coating layer.

3. The film capacitor according to claim 1, wherein the organometallic compound has at least one hydrophobic group, the hydrophobic group being different from the functional group.

4. The film capacitor according to claim 1, wherein the coating layer is substantially a monomolecular film.

5. The film capacitor according to claim 1, wherein the coating layer is made of a resin selected from the group consisting of silicone resin, denatured silicone resin and organopolysiloxane.

6. The film capacitor according to claim 1, wherein the organoaluminum compound is selected from the group consisting of aluminum triethoxide, aluminum triisopropoxide, derivatives thereof, and polymers thereof.

7. The film capacitor according to claim 1, wherein the organosilicon compound is selected from the group consisting of dimethyldimethoxysilane, vinyltrimethoxysilane, methyltriethoxysilane, hexyltrimethoxysilane, methyltrimethoxysilane, tetramethoxysilane, tetraethoxysilane, methylhydrogendimethoxysilane, dimethylvinylethoxysilane, diphenyldimethoxysilane, gamma-(2-aminoethyl)aminopropyltrimethoxysilane, gamma-(2-aminoethyl)aminopropylmethyldimethoxysilane, gamma-methacryloxypropyltrimethoxysilane, gamma-glycidoxypropyltrimethoxysilane, gamma-mercaptopropyltrimethoxysilane, vinyltriacetoxysilane, gamma-anilinopropyltrimethoxysilane, derivatives thereof, and polymers thereof.

8. The film capacitor according to claim 1, wherein the organotin compound is selected from the group consisting of tin tetra-n-butoxide, derivatives thereof, and polymers thereof.

9. The film capacitor according to claim 1, wherein the organotitanium compound is selected from the group consisting of titanium tetraisopropoxide, titanium tetra-n-butoxide, titanium tetrakis (2-ethylhexoxide), titanium diisopropoxide bis( acetylacetonate ), titanium di-n-butoxide bis(triethanolaminate), derivatives thereof, and polymers thereof.

10. A method for manufacturing a film capacitor, comprising the steps of:
    preparing a capacitor element having (a) a multilayer structure made of stacked dielectric films or a wound dielectric film, each dielectric film having a metallic layer formed on its surface, and (b) a pair of outer electrodes electrically connected to the metallic layer; and
    providing at least facets of the multilayer structure with a coating material so as to form a coating layer, the coating material containing at least one polysiloxane, at least one organometallic compound or a combination of the polysiloxane and the organometallic compound, the organometallic compound being selected from the group consisting of organoaluminum compounds, organosilicon compounds, organotin compounds and organotitanium compounds; and
    wherein the organometallic compound has at least one functional group attached to the metallic atom of the organometallic compound, the functional group being reactive to inorganic or organic materials and represented by the formula -OR, R being selected from the group consisting of hydrogen, hydrocarbyl, oxygen-containing hydrocarbyl, nitrogen-containing hydrocarbyl and oxygen- and nitrogen-containing hydrocarbyl.

11. The method for manufacturing a film capacitor according to claim 10, wherein the organometallic compound has at least one hydrophobic group, the hydrophobic group being different from the functional group.

12. The method for manufacturing a film capacitor according to 10, wherein the step of providing includes a step of applying to the capacitor element a solution containing the coating material.

13. The method for manufacturing a film capacitor according to 10, wherein the step of providing includes a step of immersing the capacitor element into a solution containing the coating material.

14. The method for manufacturing a film capacitor according to 13, wherein the solution containing the coating material has a viscosity at 25° C. of not more than $2 \times 10^{-3}$ Pa.s.

15. The method for manufacturing a film capacitor according to claim 10, wherein the coating material contains a combination of organosilicon compound and silicone resin, or a combination of organosilicon compound and denatured silicone resin.

16. The method for manufacturing a film capacitor according to claim 10, wherein the organosilicon compound is selected from the group consisting of dimethyldimethoxysilane, vinyltrimethoxysilane, methyltriethoxysilane, hexyltrimethoxysilane, methyltrimethoxysilane, tetramethoxysilane, tetraethoxysilane, methylhydrogendimethoxysilane, dimethylvinylethoxysilane, diphenyldimethoxysilane, gamma-(2-aminoethyl-)aminopropyltrimethoxysilane, gamma-(2-aminoethyl-)aminopropylmethyldimethoxysilane, gamma-methacryloxypropyltrimethoxysilane, gamma-glycidoxypropyltrimethoxysilane, gamma-mercaptopropyltrimethoxysilane, vinyltriacetoxysilane, gamma-anilinopropyltrimethoxysilane, derivatives thereof, and polymers thereof.

17. The method for manufacturing a film capacitor according to claim 13, wherein the step of immersing is accompanied by an ultrasonic treatment of the immersed capacitor element.

18. The method for manufacturing a film capacitor according to 10, wherein the step of immersing is followed by a step of curing by heat treatment of the coating material provided on the capacitor element.

* * * * *